(12) United States Patent
Liang et al.

(10) Patent No.: US 10,250,581 B2
(45) Date of Patent: Apr. 2, 2019

(54) CLIENT, SERVER, RADIUS CAPABILITY NEGOTIATION METHOD AND SYSTEM BETWEEN CLIENT AND SERVER

(71) Applicant: ZTE Corporation, Shenzhen, Guangdong (CN)

(72) Inventors: Qiandeng Liang, Shenzhen (CN); Yuxi Gan, Shenzhen (CN); Liang Fan, Shenzhen (CN); Huaxing Zhu, Shenzhen (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 322 days.

(21) Appl. No.: 14/783,759

(22) PCT Filed: Sep. 18, 2013

(86) PCT No.: PCT/CN2013/083836
§ 371 (c)(1),
(2) Date: Oct. 9, 2015

(87) PCT Pub. No.: WO2014/166210
PCT Pub. Date: Oct. 16, 2014

(65) Prior Publication Data
US 2016/0072784 A1 Mar. 10, 2016

(30) Foreign Application Priority Data

Apr. 9, 2013 (CN) .......................... 2013 1 0121349

(51) Int. Cl.
*H04L 29/06* (2006.01)
*H04L 12/24* (2006.01)

(52) U.S. Cl.
CPC .......... *H04L 63/08* (2013.01); *H04L 41/0813* (2013.01); *H04L 63/0892* (2013.01); *H04L 63/205* (2013.01); *H04L 67/42* (2013.01)

(58) Field of Classification Search
CPC ....... H04L 63/10; H04L 63/08; H04L 63/102; H04W 12/06; H04W 12/08
(Continued)

(56) References Cited

U.S. PATENT DOCUMENTS 6,834,050 B1   12/2004   Madour
6,834,300 B1   12/2004   Barna
(Continued)

FOREIGN PATENT DOCUMENTS

CN   1428032 A    7/2003
CN   1463123 A   12/2003
(Continued)

OTHER PUBLICATIONS

Supplementary European Search Report in European application No. 13881808.3, dated Mar. 3, 2016.
(Continued)

*Primary Examiner* — William S Powers
(74) *Attorney, Agent, or Firm* — Oppedahl Patent Law Firm LLC (57) ABSTRACT

Disclosed are a client, a server, an RADIUS capability negotiation method and system, and the method includes: a client transmits to a server a first message carrying RADIUS capability parameters of the client; the server captures the RADIUS capability parameters in the first message, matches the RADIUS capability parameters in the first message with RADIUS capability parameters of the server to obtain a matching result, and transmits the matching result to the client through a second message; and the client determines whether to establish effective communication with the server according to the matching result in the second message. By means of the technical solutions of the disclosure, it is possible to extend the RADIUS protocol, and to solve the problem existing in the current RADIUS protocol that both
(Continued)

sides in communication cannot perform RADIUS capability negotiation.

13 Claims, 7 Drawing Sheets

(58) Field of Classification Search
USPC .................................................................. 726/4
See application file for complete search history.

(56) References Cited

U.S. PATENT DOCUMENTS

| | | | |
|---|---|---|---|
| 9,253,019 | B1* | 2/2016 | Ronnanov ............ H04L 67/1008 |
| 2006/0026671 | A1* | 2/2006 | Potter ..................... H04L 63/08 |
| | | | 726/7 |
| 2006/0212928 | A1* | 9/2006 | Maino ................... H04L 9/0841 |
| | | | 726/4 |
| 2012/0177195 | A1* | 7/2012 | Elliott ................. H04L 12/6418 |
| | | | 379/240 |
| 2013/0070757 | A1* | 3/2013 | Elliott ................. H04L 12/6418 |
| | | | 370/352 |

FOREIGN PATENT DOCUMENTS

| | | |
|---|---|---|
| CN | 1464681 A | 12/2003 |
| CN | 1464714 A | 12/2003 |
| CN | 1744597 A | 3/2006 |
| CN | 1787434 A | 6/2006 |
| CN | 1905554 A | 1/2007 |
| CN | 101141260 A | 3/2008 |
| CN | 101400063 A | 4/2009 |
| CN | 101771547 A | 7/2010 |
| CN | 101778385 A | 7/2010 |
| CN | 101795302 A | 8/2010 |
| CN | 201571069 U | 9/2010 |
| CN | 101855928 A | 10/2010 |
| CN | 102025476 A | 4/2011 |
| CN | 102045684 A | 5/2011 |
| CN | 102055589 A | 5/2011 |
| CN | 102055772 A | 5/2011 |
| CN | 102111289 A | 6/2011 |
| CN | 102118750 A | 7/2011 |
| CN | 102118766 A | 7/2011 |
| CN | 102136938 A | 7/2011 |
| CN | 201976140 U | 9/2011 |
| CN | 102299803 A | 12/2011 |
| CN | 102364907 A | 2/2012 |
| CN | 102447254 A | 5/2012 |
| CN | 102594684 A | 7/2012 |
| CN | 102595487 A | 7/2012 |
| CN | 202334564 U | 7/2012 |
| CN | 102638463 A | 8/2012 |
| CN | 103227773 A | 7/2013 |
| EP | 1043869 A2 | 10/2000 |
| WO | 0167706 A2 | 9/2001 |

OTHER PUBLICATIONS

Dekuk Freeradius G Halwasia S Danda M Kumar Cisco Systems A: "Capability Negotiation in Radius; draft-halwasia-radext-capability-negotiation-01.txt", Capability Negotiation in Radius; Draft-Halwasia-Radext-Capability-Negotiation-01.txt, Internet Engineering Task Force, IETF; Standardworkingdraft, Internet Society (ISOC) 4, Rue Des Falaises CH-1205 Geneva, Switzerland, Oct. 8, 2012 (Oct. 8, 2012), pp. 1-12, XP015087658, [retrieved on Oct. 8, 2012].

International Search Report in international application No. PCT/CN2013/083836, dated Jan. 16, 2014.

English Translation of the Written Opinion of the International Search Authority in international application No. PCT/CN2013/083836, dated Jan. 16, 2014.

* cited by examiner

CLIENT, SERVER, RADIUS CAPABILITY NEGOTIATION METHOD AND SYSTEM BETWEEN CLIENT AND SERVER

TECHNICAL FIELD

The present disclosure relates to the field of communications, and in particular to a client, a server, and an RADIUS capability negotiation method and system based on a Remote Authentication Dial In User Service (RADIUS) protocol.

BACKGROUND

With the popularity of Internet applications and broadband services, in order to provide users with refined operational services, various operators allocate an Authentication Authorization and Accounting (AAA) system for identity authentication of broadband users, package and service authorization and calculation of charges; in the AAA system, a gateway/server equipment such as an existing Broadband Remote Access Server (BRAS) or Broadband Network Gateway (BNG) serves as an AAA client that communicates with an AAA server through an RADIUS protocol, in this way, the AAA server serves as an RADIUS server and the gateway/server equipment such as the BRAS serves as an RADIUS client.

In prior arts, since there is no necessary capability negotiation mechanism between the RADIUS client and the RADIUS server, when an RADIUS communication protocol is upgraded, the RADIUS client and the RADIUS server are required to be upgraded synchronously, but it is hard to implement synchronous upgrading of all RADIUS clients in a scenarios where plenty of RADIUS clients are allocated in a network, thereby resulting in inconvenience of upgrading of RADIUS servers.

Therefore, how to provide an RADIUS communication method having RADIUS negotiation capability is a technical problem that has yet to be resolved by those skilled in the art.

SUMMARY

In view of the above, embodiments of the disclosure are intended to provide a client, a server, and an RADIUS capability negotiation method and system that can solve the problem that an RADIUS system cannot perform communication capability negotiation.

To this end, the technical solutions of the disclosure are implemented as follows.

Provided is an RADIUS capability negotiation method, and in an embodiment of the disclosure, the RADIUS capability negotiation method includes:

a client transmits to a server a first message carrying RADIUS capability parameters of the client;

the server captures the RADIUS capability parameters in the first message, matches the RADIUS capability parameters in the first message with RADIUS capability parameters of the server to obtain a matching result, and transmits the matching result to the client through a second message; and the client determines whether to establish effective communication with the server according to the matching result in the second message.

Preferably, in the above embodiment, the step that the client determines whether to establish effective communication with the server according to the matching result in the second message comprises: the client determines whether the matching result indicates successful matching, if yes, effective communication with the server is established.

Provided is a client, in an embodiment, the client includes a first transmission module, a first reception module and a first communication module, wherein the first transmission module is configured to transmit to a server a first message carrying Remote Authentication Dial In User Service (RADIUS) capability parameters of the client;

the first reception module is configured to receive a second message fed back by the server, which carries a matching result obtained from matching, by the server, the RADIUS capability parameters in the first message with RADIUS capability parameters of the server; and the first communication module is configured to determine whether to establish effective communication with the server according to the matching result in the second message.

Provided is a client, in an embodiment, the client includes a first transmission module, a first reception module and a first communication module, wherein the second reception module is configured to receive a first message transmitted form a client, which carries Remote Authentication Dial In User Service (RADIUS) capability parameters of the client;

the matching module is configured to capture the RADIUS capability parameters in the first message, match the RADIUS capability parameters in the first message with RADIUS capability parameters of the server to obtain a matching result; and the second transmission module is configured to transmit to the client a second message carrying the matching result.

An embodiment of the disclosure provides an RADIUS capability negotiation system, and the system includes at least one client provided by an embodiment of the disclosure and at least one server provided by an embodiment of the disclosure, wherein the client and the server performs RADIUS capability negotiation using the RADIUS capability negotiation method provided by an embodiment of the disclosure.

In the client, server, and RADIUS capability negotiation method and system provided by embodiments of the disclosure, the client transmits a first message to perform RADIUS capability negotiation with the server, and then establishes effective communication with the server according to a matching result fed back from the server; for example, when the matching result indicates successful matching, effective communication with the server is established, it is ensured that the RADIUS capability of a client that can establish effective communication is consistent with or matches the RADIUS capability of both ends of the server, thus it is possible to solve the problem existing in the prior art that, due to inconsistent or mismatching RADIUS capability, RADIUS communication cannot be performed between an RADIUS client and an RADIUS server where there is a connection established therebetween and a failure in authentication of a broadband user is resulted, thereby improving user experiences.

DETAILED DESCRIPTION

In order to make features and technical content of embodiments of the disclosure understood in more detail, implementation of the embodiments of the disclosure will be elaborated below with reference to accompanying drawings that are for reference and illustration only and are not intended to limit the embodiments of the disclosure.

For ease of description below, an "RADIUS client" in an RADIUS communication system is directly marked as a "client"; and the "client" may be one or more of gateway/server equipments such as a Broadband Remote Access Server (BRAS), an IP Broadband Network Gateway (BNG), a Service Router (SR) or an Access Controller (AC), a "server" may be one or more of an AAA server supporting the RADIUS protocol, a portal authentication server, a web authentication server or a Change of Attribute server.

Figure 1:
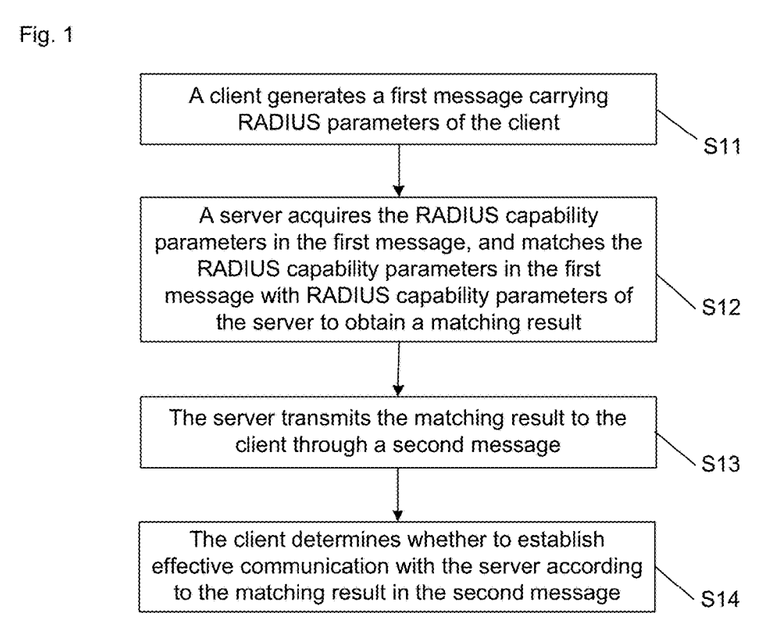
FIG. 1 is a schematic diagram showing an RADIUS capability negotiation method provided by an embodiment of the disclosure.

FIG. 1 is a schematic diagram showing an RADIUS capability negotiation method provided by an embodiment of the disclosure; it can be known from FIG. 1 that in the embodiment, the RADIUS capability negotiation method provided by embodiment of the disclosure includes the following steps:

S11, a client generates a first message carrying RADIUS parameters of the client;

S12, a server captures the RADIUS capability parameters in the first message, and matches the RADIUS capability parameters in the first message with RADIUS capability parameters of the server to obtain a matching result;

S13, the server transmits the matching result to the client through a second message; and S14, the client determines whether to establish effective communication with the server according to the matching result in the second message.

The "effective communication" in step of the embodiment refers to communication established between the client and a server transmitting the second message, the server can perform operations such as authentication, authorization and accounting on broadband users accessing the client, the server has no failures, and the client has RADIUS capability consistent with or matching that of the server.

In another preferred embodiment, the first message in the embodiment shown in FIG. 1 can be generated in real time by the client according to its RADIUS parameters or can be set by an operator when establishing the RADIUS client.

In another preferred embodiment, step S14 in the embodiment shown in FIG. 1 may include:

the client determines whether the matching result indicates successful matching, if yes, it indicates that the client has RADIUS parameters matching that of the server, the client establishes effective communication with the server based on the RADIUS parameters; when the matching result indicates failed matching, then the client cannot establish effective communication with the server.

In another preferred embodiment, before step S11 of the embodiment shown in FIG. 1, the RADIUS capability negotiation method may further include: the server transmits to the client a query RADIUS parameter request; after receiving the query RADIUS parameter request, the client implements step S11, i.e., transmits the first message to the server.

In another preferred embodiment, after step S13, the RADIUS capability negotiation method in the embodiment shown in FIG. 1 may further include: the client transmits to the server a response message to the second message for informing the server that the client receives the second message; accordingly, the response message to the second message may also be transmitted by the client to the server after completion of step S14, then the response message to the second message carries the matching result indicating whether the client establishes successfully effective communication with the server.

In another preferred embodiment, the RADIUS parameter in the embodiment shown in FIG. 1 includes communication parameters such as Attribute Value Pair (AVP) set information; specifically, the AVP set information includes identification information showing whether respective AVPs must be supported by necessary clients/servers, specifically, the first message transmitted by the client carries an AVP set supported by the client and an AVP set required to be necessarily supported by the server; after receiving the first message, the server extracts AVP set information, and determines, according to an AVP set supported by the server and an AVP set required to be necessarily supported by the client, whether the server can be compatible with or meet the client; the matching result indicates successful matching only when the AVP set supported by the server meets an AVP set required by the client to be necessarily supported by the server and the AVP set supported by the client meets an AVP set required by the server to be necessarily supported by the client, then the client establishes effective communication with the server; if an AVP set supported by a side cannot meet an AVP set required by an opposite side to be necessarily supported, the client cannot establish effective RADIUS communication with the server;

through the matching process, it is possible to avoid an effective connection to be established between a client (server) operating via an RADIUS protocol having high capability requirements and a server (client) operating via an RADIUS protocol having low capability requirements, so that when protocol capability upgrading is performed on the server (client) operating via an RADIUS protocol having low capability requirements, the service processing of the client (server) operating via an RADIUS protocol having high capability requirements will not be affected.

In order to implement negotiation of an authentication mode between the client and the server, in another preferred embodiment, the first message in the embodiment shown in FIG. 1 may further carry an authentication mode supported by the client; the second message may further carry an authentication mode selected by the server; the client performs authentication with the server according to the authentication mode selected by the server carried in the second message; specifically, the authentication mode includes but is not limited to authentication modes based on a Password Authentication Protocol (PAP), a Challenge Handshake Authentication Protocol (CHAP), a Microsoft Challenge Handshake Authentication Protocol (MSCHAP) and an Extensible Authentication Protocol (EAP); then, the client transmits through the first message, to the server, names of one or more authentication modes supported by the client, the server matches these authentication modes with those supported by the server, selects one or more optimal authentication modes, adds names of one or more selected authentication modes to the second message to inform the client to use the authentication modes to perform authentication operations, then the server and the client authenticates other each using an authentication mode supported by both of them, and only authentication of the client by the server is also allowed so as to enhance verification of valid identity of the client.

After the client establishes a connection with the server, in order to implement detection and keep-alive of a communication state between the client and the server, in another preferred embodiment, the first message in the embodiment shown in FIG. 1 may further carry a communication state detection mode supported by the client; the second message may further carry a communication state detection mode selected by the server, and the client performs communication state detection with the server according to the communication state detection mode selected by the server carried in the second message. The communication state detection mode includes: hardware detection (e.g., warning a detected link failure through Synchronous Digital Hierarchy (SDH)), slow Hello mechanism (a Hello message mechanism in a routing protocol is usually used) and other detection mechanisms, different protocols may provide a specialized detection mechanism in some cases, but during interconnection and intercommunication of a system, such a specialized detection mechanism is hard to be deployed, such as Bidirectional Forwarding Detection (BFD) mechanism; for the RADIUS protocol, the detection mechanism of the client and the server can be keep-alive through a heartbeat message, it can also be to detect the communication state by periodically detecting whether a keep-alive message transmitted from an opposite end is received; then the first message may further carry a state keep-alive cycle suggested by the client; the second message may further carry a state detection mode selected by the server, a suggested state keep-alive cycle or non-keep-alive identifier, specifically.

When the state detection mode selected by the server is to perform state keep-alive through a heartbeat message, the heartbeat message may include an echo request message and a echo reply message; the transmission mode of the heartbeat message may include: the client transmits the echo request message to the server, and the server transmits the echo reply message to the client; accordingly, the transmission mode of the heartbeat message may further include: the server transmits the echo request message to the client, and the client transmits the echo replay message to the server;

when the state detection mode selected by the server is to detect the communication state by periodically detecting whether a keep-alive message transmitted from an opposite end is received, the detection method may include: the server periodically transmits to the client a keep-alive message, and the client detects during a preset time period (at a preset time point) whether the keep-alive message is received, if yes, it indicates that the communication state is good; otherwise, it is considered that the communication link is broken; accordingly, the detection method may further include: the client periodically transmits to the server a keep-alive message, the server detects during a preset time period (at a preset time point) whether the keep-alive message is received, if yes, it indicates that the communication state is good; otherwise, it is considered that the communication link is broken.

Figure 2:
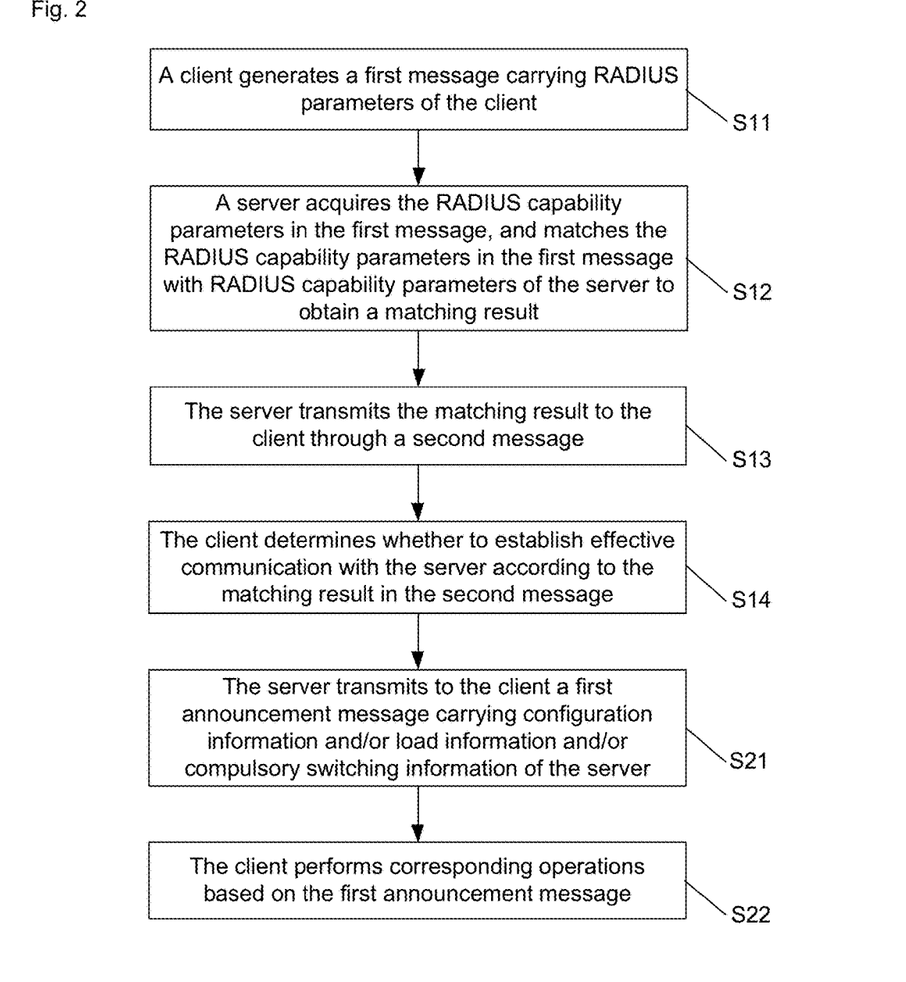
FIG. 2 is a schematic diagram showing an RADIUS capability negotiation method provided by another embodiment of the disclosure.

FIG. 2 is a schematic diagram showing an RADIUS capability negotiation method provided by an embodiment of the disclosure; it can be known from FIG. 2 that in the embodiment, the RADIUS capability negotiation method provided by embodiment of the disclosure further includes:

after the client transmits the first message to the server,

S21, the server transmits to the client a first announcement message carrying configuration information and/or load information and/or compulsory switching information of the server; and S22, the client performs corresponding operations based on the first announcement message, for example, receiving configuration information of the server and/or shunting user authentication traffics to a server having a relatively light load according to load amounts of a group of servers configured on the client and/or selecting compulsorily any other light-loaded server configured on the client for user authentication;

specifically, the step that the client performs corresponding operations based on the first announcement message may include:

when the first announcement message carries configuration information of the server, the step that the client performs communication operations based on the first announcement message includes: the client configures its communication parameters according to the configuration information of the server, and to perform effective communication with the server according to its communication parameters; for example, when the configuration information includes communication parameters such as an encryption/decryption algorithm selected by the server and a public key of an asymmetrical encryption algorithm calculated from certificates/configurations of both the client and the server, the step that the client performs communication operations based on the first announcement message includes: the client selects a secret key and an algorithm corresponding to an encryption/decryption algorithm selected by the server, and performs effective communication with the server according to these communication parameters so as to implement operations such as authentication, authorization and accounting of a broadband user;

and/or, when the first announcement message carries load information of the server, the step that the client performs communication operations based on the first announcement message includes: the client configures assignment of a broadband user accessing the client to a server for authentication, authorization and accounting according to the load information of the server; for example, when a server has a relatively large load, a client that has established an effective communication with the server transfers a broadband user accessing the client to any other server having a relatively small load;

and/or, when the first announcement message carries compulsory switching information of the server, the step that the client performs communication operations based on the first announcement message includes: the client transfers compulsorily a broadband user accessing the server to any other server; for example, when a server is required to upgrade the RADIUS protocol (communication failure), the server issues, to all clients connected to the server, the compulsory switching information for indicating that the server is in an RADIUS protocol upgrading (communication failure) state, the compulsory switching information can be special AVP set information, all clients that have established effective communication with the server transfer all broadband users accessing the server to other servers that are not upgraded or don't finish upgrading.

In another preferred embodiment, before step S21 of the embodiment shown in FIG. 2, the RADIUS capability negotiation method further includes: the client transmits to the server an announcement request message; after receiving the announcement request message, the server implements step S21, i.e., transmits the first announcement message to the client.

Figure 3:
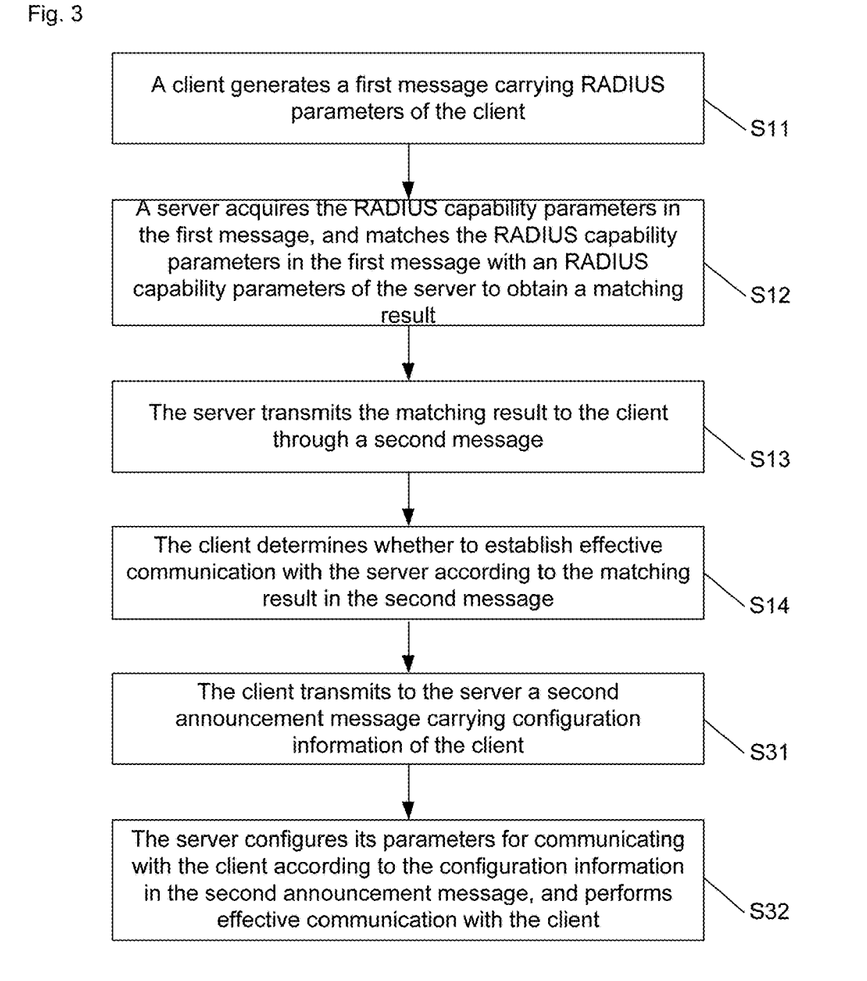
FIG. 3 is a schematic diagram showing an RADIUS capability negotiation method provided by another embodiment of the disclosure.

FIG. 3 is a schematic diagram showing an RADIUS capability negotiation method provided by an embodiment of the disclosure; it can be known from FIG. 3 that in the embodiment, the RADIUS capability negotiation method provided by embodiment of the disclosure further includes: after the client transmits the first message to the server, S31, the client transmits to the server a second announcement message carrying configuration information of the client; and S32, the server configures its parameters for communicating with the client according to the configuration information in the second announcement message, and performs effective communication with the client.

For example, before the client establishes effective communication with the server and after the client transmits, through the second announcement message, to the server, the configuration information such as an encryption/decryption algorithm selected by the client and a secret key, the server can select an algorithm and a public key corresponding to the encryption/decryption algorithm selected by the client to configure communication parameters for effective communication between the server and the client, and perform effective communication with the client according to the communication parameters so as to implement operations such as authentication, authorization and accounting of a broadband user; after the client establishes effective communication with the server and when the client modifies a communication state detection cycle due to restart and the like, the client may also inform the server of the modified communication state detection cycle through the second announcement message, and the server performs check of communication state according to the modified communication state detection cycle.

Figure 4:
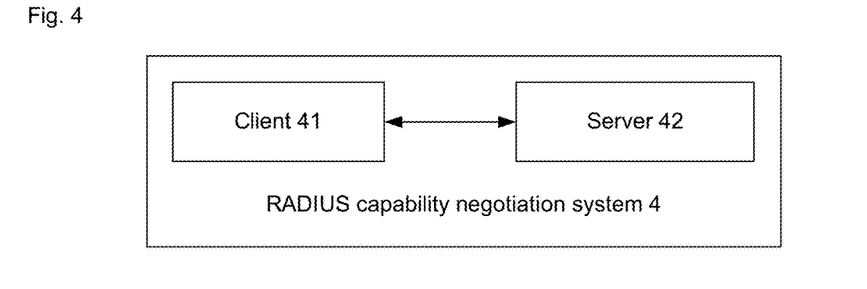
FIG. 4 is a schematic diagram showing an RADIUS capability negotiation system provided by an embodiment of the disclosure.

FIG. 4 is a schematic diagram showing an RADIUS capability negotiation system provided by an embodiment of the disclosure; it can be known from FIG. 4 that in the embodiment, an RADIUS capability negotiation system 4 provided by the embodiment of the disclosure includes at least one client 41 and at least one server 42, and the client 41 communicates with the server 42 using the RADIUS capability negotiation method according to the embodiment shown in FIG. 1 to implement operations such as negotiation of the RADIUS capability; specifically, the client 41 generates a first message carrying RADIUS parameters of the client 41; the client 41 transmits the first message to the server 42; the server 42 transmits to the client 41 a second message carrying a matching result obtained from matching, by the server 42, the first message according to its RADIUS capability parameters; the client 41 determines whether to establish effective communication with the server 42 according to the matching result in the second message.

In practical applications, the client 41 can be implemented by one or more of gateway/server equipments such as a BRAS, a BNG, an SR or an AC; the server 42 can be implemented by one or more of an AAA server supporting the RADIUS protocol, a portal authentication server, a web authentication server, a CoA server.

Figure 5:
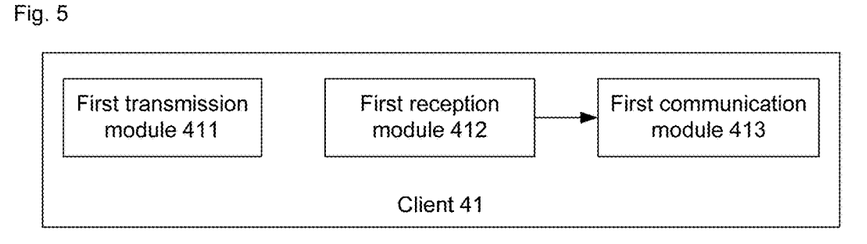
FIG. 5 is a schematic diagram showing a client provided by an embodiment of the disclosure.

FIG. 5 is a schematic diagram showing a client provided by an embodiment of the disclosure; it can be known from FIG. 5 that in the embodiment, a client 41 provided by the embodiment of the disclosure includes a first transmission module 411, a first reception module 412 and a first communication module 413, wherein the first transmission module 411 is configured to transmit to a server 42 a first message carrying a Remote Authentication Dial In User Service (RADIUS) capability parameters of a client 41;

the first reception module 412 is configured to receive a second message fed back by the server 42, which carries a matching result obtained from matching, by the server 42, the RADIUS capability parameters in the first message with RADIUS capability parameters of the server; and the first communication module 413 is configured to determine whether to establish effective communication with the server based on the matching result in the second message received by the first reception module 412.

In another preferred embodiment, the first reception module 412 in the embodiment shown in FIG. 4 may be further configured to receive a first announcement message transmitted from the server 42, which carries configuration information and/or load information and/or compulsory switching information of the server 42; the first communication module 413 may be further configured to perform corresponding operations based on the first announcement message, specifically, the first communication module 413 is further configured to configure its communication parameters according to the configuration information in the first announcement message, and to perform effective communication with the server 42; and/or the first communication module 413 is further configured to configure assignment of a broadband user accessing the client to a server for authentication, authorization and accounting according to the load information in the first announcement message; and/or the first communication module 413 is further configured to transfer compulsorily a broadband user accessing a server to any other server according to the compulsory switching information in the first announcement message.

Preferably, the first transmission module 411 in the above embodiment may be further configured to transmits an announcement request message to the server 42, and the first announcement message received by the first reception module 412 is transmitted by the server 42 after reception of the announcement request message.

Preferably, the first transmission module 411 in the above embodiment may be further configured to transmit to the server 42 a response message to the second message so as to inform the server 42 that the client 41 has received the second message transmitted by the server 42 and/or whether the client 41 establishes successfully effective communication with the server according to the second message.

Preferably, the first transmission module 411 in the above embodiment may be further configured to transmit to the server a keep-alive request message, and the first reception module 412 may be further configured to receive a keep-alive response message fed back from the server 42 so as to ensure the reliability of the effective communication between the client 41 and the server 42.

Preferably, the first transmission module 411 in the above embodiment may be further configured to transmit to the server 42 a second announcement message carrying the configuration information of the client 41; and configured to inform the server 42 to configure, according to the configuration information of the client 41 carried in the second announcement message, communication parameters for the server and the client to perform effective communication, and to perform effective communication with the client 41 transmitting the second announcement message.

In practical applications, the first transmission unit 411, first reception unit 412 and the first communication module 413 in the client can be implemented by a Central Processing Unit (CPU), a Digital Signal Processor (DSP) or a Field-Programmable Gate Array (FPGA) in the client 41.

Figure 6:
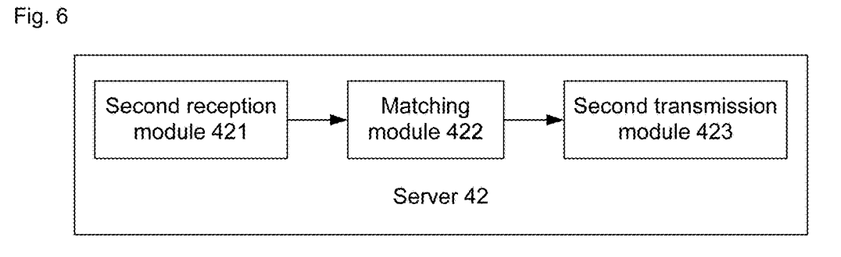
FIG. 6 is a schematic diagram showing a server provided by an embodiment of the disclosure.

FIG. 6 is a schematic diagram showing a server provided by an embodiment of the disclosure; it can be known from FIG. 6 that in the embodiment, a server 42 provided by the embodiment of the disclosure includes a second reception module 421, a matching module 422 and a second transmission module 423, wherein the second reception module 421 is configured to receive a first message transmitted form a client 41, which carries Remote Authentication Dial In User Service (RADIUS) capability parameters of the client 41;

the matching module 422 is configured to capture the RADIUS capability parameters in the first message, match the RADIUS capability parameters in the first message with RADIUS capability parameters of the server to obtain a matching result; and the second transmission module 423 is configured to transmit to the client 41 a second message carrying the matching result.

In another preferred embodiment, the second transmission module 423 of the embodiment shown in FIG. 5 may be further configured to transmit to the client 41 a first announcement message carrying configuration information and/or load information and/or a compulsory switching identifier of the server 42.

Preferably, the second reception module 421 in the above embodiment may be further configured to receive an announcement request message transmitted from the client 41, and the second transmission module 423 transmits the first announcement message to the client 41 after the second reception module 421 receives the announcement request message.

Preferably, the second reception module 421 in the above embodiment may be further configured to receive the response message to the second message transmitted from the client 41, and the response message to the second message is used to inform the server 42 that the client 41 has received the second message transmitted by the server 42 and/or whether the client 41 establishes successfully effective communication with the server 42 according to the second message.

Preferably, the second reception module 421 in the above embodiment may be further configured to receive a keep-alive request message transmitted by the client 41, and the second transmission module 422 may be further configured to feed back a keep-alive response message to the client 41 so as to ensure the reliability of the effective communication between the client 41 and the server 42.

In practical applications, the second reception module 421, the matching module 422 and the second transmission module 423 in the server 42 can be implemented by a CPU, a DSP or an FPGA in the server 42.

Figure 7:
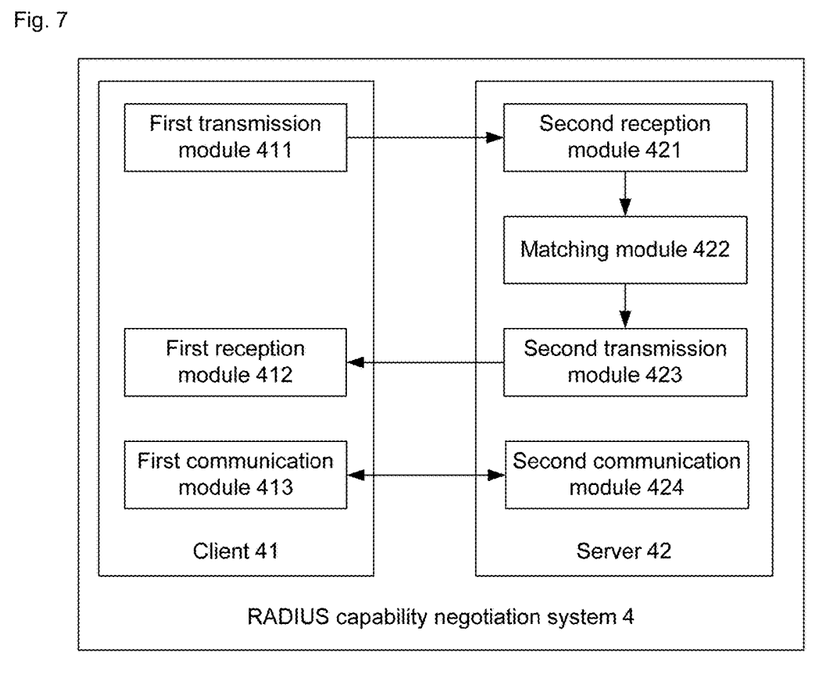
FIG. 7 is a schematic diagram showing an RADIUS capability negotiation system provided by another embodiment of the disclosure.

FIG. 7 is a schematic diagram showing an RADIUS capability negotiation system provided by another embodiment of the disclosure; it can be known from FIG. 7 that in the embodiment, the server 42 in the embodiment shown in FIG. 7 further includes a second communication module 424; then the second reception module 421 is further configured to receive a second announcement message transmitted by the client, which carries configuration information of the client; the second communication module 424 is configured to configure its parameters for communicating with the client according to the configuration information in the second announcement message, and to perform effective communication with the client.

It can be intuitively seen from FIG. 7 that the current RADIUS protocol is extended in the embodiment of the disclosure, and in the embodiment of the disclosure, the first transmission module 411, the first reception module 412, the second reception module 421 and the second transmission module 423 implement, through the extended RADIUS protocol, operations such as RADIUS capability negotiation between the client and the server, selection of an authentication mode, selection of a communication state detection mode, interaction between the first announcement message and the second announcement message and the like; communication parameters such as a corresponding capability negotiation result, a selected authentication mode and communication state detection mode, a communication state detection result, configuration information of an opposite end captured from an announcement message and the like are for use by the first communication module 413 and the second communication module 424; the first communication module 413 and the second communication module 424 communicates through the current RADIUS protocol, for example, the first communication module 413 forwards, through the RADIUS protocol, an access request of a broadband user to the second communication module 424, the second communication 424 performs authentication processing on the access request and transmits an authentication result to the first communication module 413 through the RADIUS protocol, and then the first communication module 413 performs operations such as forwarding the authentication result to the broadband user so as to implement authentication, authorization and accounting of operations of the broadband user such as accessing.

In practical applications, the second communication module 424 in the server 42 can be implemented by a CPU, a DSP or an FPGA in the server 42.

Figure 8:
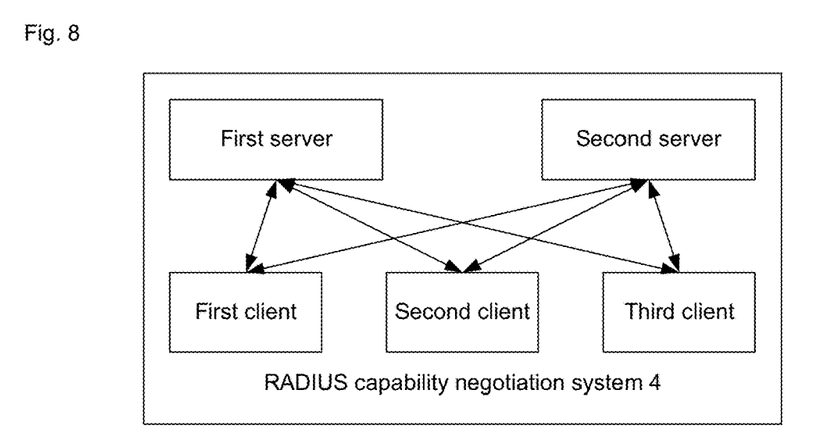
FIG. 8 is a schematic diagram showing an RADIUS capability negotiation system provided by another embodiment of the disclosure.
Figure 9:
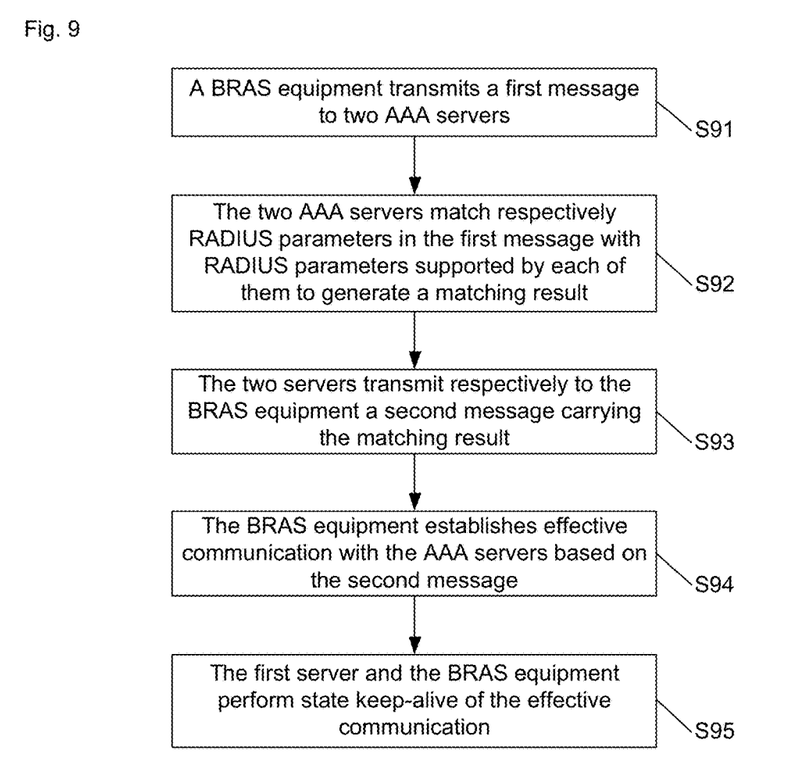
FIG. 9 is a schematic diagram showing an RADIUS capability negotiation method provided by another embodiment of the disclosure.
Figure 10:
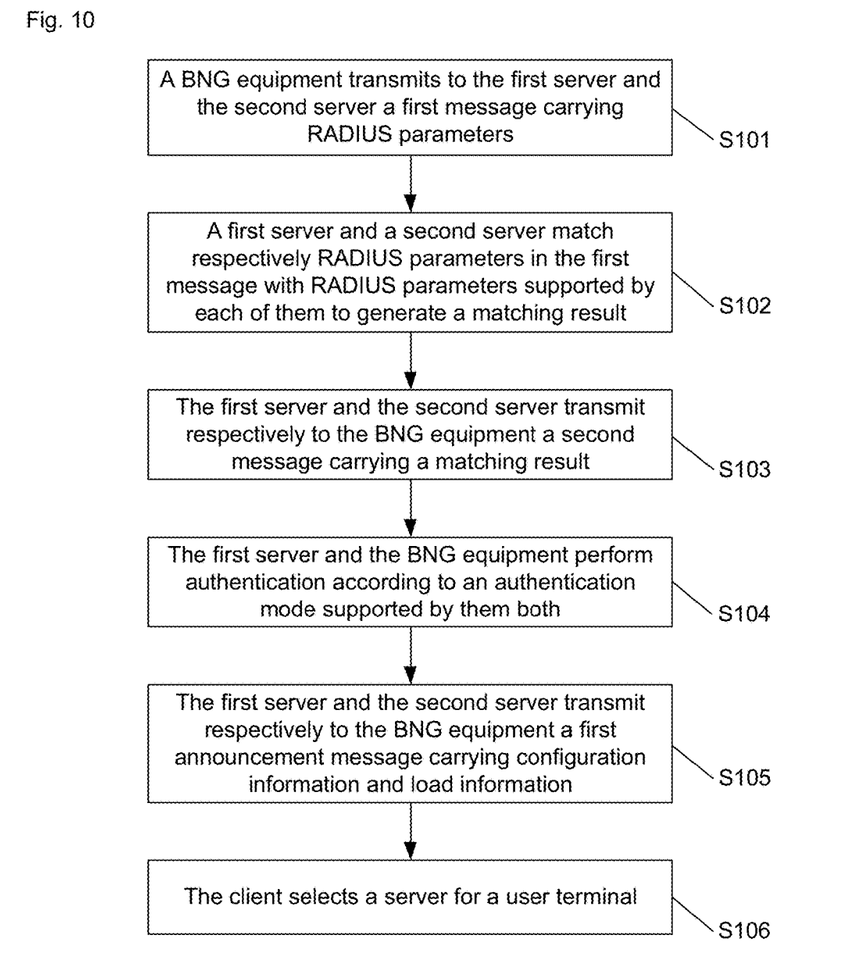
FIG. 10 is a schematic diagram showing an RADIUS capability negotiation method provided by another embodiment of the disclosure.
Figure 11:
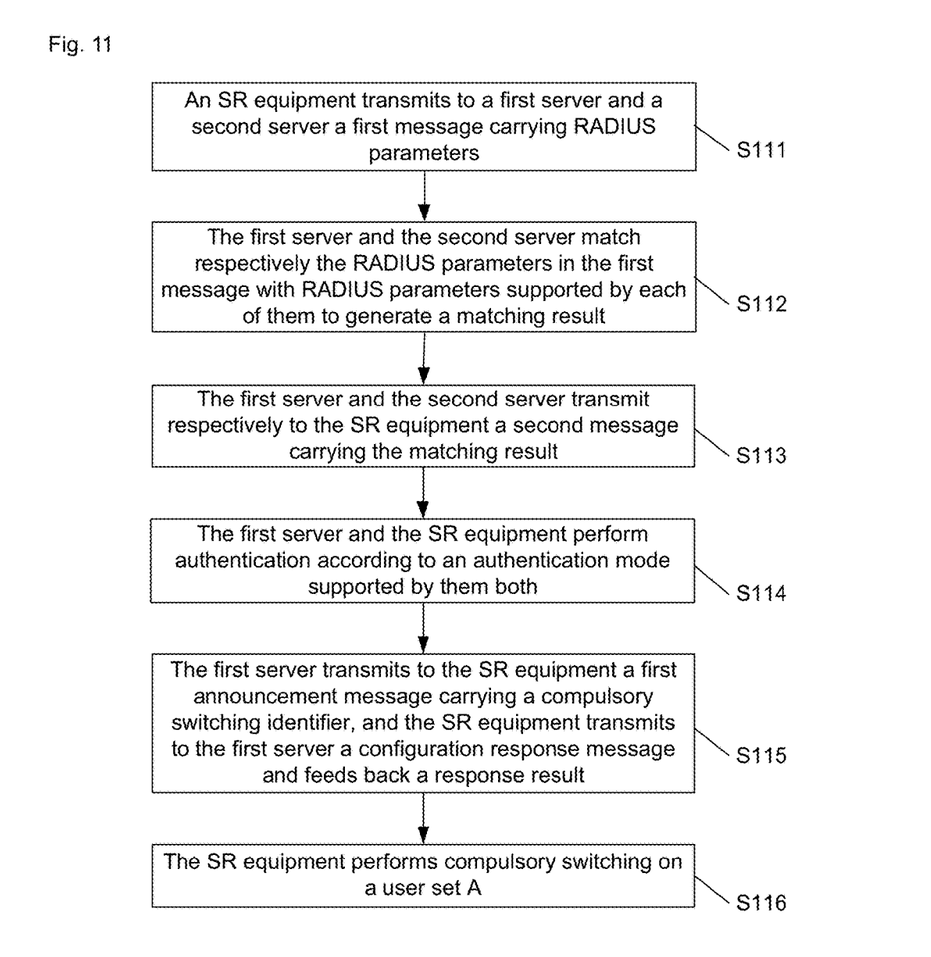
FIG. 11 is a schematic diagram showing an RADIUS capability negotiation method provided by another embodiment of the disclosure.

FIG. 8 is a schematic diagram showing an RADIUS capability negotiation system provided by another embodiment of the disclosure, FIGS. 9, 10 and 11 are schematic diagrams showing an RADIUS capability negotiation method provided by another embodiment of the disclosure, the embodiment of the disclosure will be further elaborated with reference to FIG. 8 to FIG. 10 in combination with examples; it can be know from FIG. 8 that in the embodiment, the RADIUS capability negotiation system 4 provided by the embodiment of the disclosure includes two servers (a first server and a second server) and three clients (a first client, a second client and a third client), which are described below with reference to FIGS. 9, 10 and 11.

Implementation of establishment of effective communication between the client and the server and of a state keep-alive function: in the embodiment, the first client is set as a BRAS equipment (it can be predicted that the first client may also be one of gateway/server equipments such as a BNG, an SR or an AC), the first server and the second server are both set as an AAA server, and it can be known from FIG. 9 that the RADIUS capability negotiation method in the embodiment includes:

S91, a BRAS equipment transmits a first message to two AAA servers;

the first message carries information of AVP sets of the BRAS equipment, i.e., an AVP set supported by the BRAS equipment and an AVP set required to be necessarily supported by the servers; the first message further carries an authentication mode supported by the BRAS equipment, such as modes based on PAP, CHAP and MSCHAP.

S92, the two AAA servers match respectively RADIUS parameters in the first message with RADIUS parameters supported by each of them to generate a matching result;

the step that the AAA server matches the RADIUS parameters in the first message with the RADIUS parameters supported by itself includes specifically: the AAA server matches various versions of the RADIUS protocol supported by itself with versions supported by the BRAS equipment, the AAA server matches an AVP set supported by itself with the AVP set required by the BRAS equipment to be necessarily supported in the first message, the AAA server matches various authentication modes supported by itself with various authentication modes supported by the BRAS equipment, and the AAA server matches various keep-alive cycles supported by itself with the keep-alive cycle suggested by the BRAS equipment in the first message. In the embodiment, the matching process includes: matching of AVP set information and authentication modes, setting a matching result of the first server as successful matching, and setting a matching result of the second server as failed matching.

S93, the two servers transmit respectively to the BRAS equipment a second message carrying the matching result;

further, if the first message carries a keep-alive cycle suggested by the RADIUS client, the RADIUS server carries, in the second message, a keep-alive cycle suggested by the RADIUS server, or carries a non-keep-alive identifier in the second message.

S94, the BRAS equipment establishes effective communication with the AAA servers based on the second message;

in the embodiment, since only the matching result of the first server is successful matching, the BRAS equipment establishes effective communication only with the first server, and performs authentication according to an authentication mode supported both by the BRAS equipment and the first server;

S95, the first server and the BRAS equipment perform state keep-alive of the effective communication;

when the first server carries, in a participation response message, a non-keep-alive identifier, then a heartbeat message is not transmitted between the AAA server and the BRAS equipment. When the AAA server carries, in the participation response message, a suggested keep-alive cycle, then the state keep-alive is perform between the BRAS equipment and the AAA server by transmission of a heartbeat message, in this step, it can be determined by the AAA server according to its configuration strategy whether keep-alive is performed;

the heartbeat message includes an echo request message and an echo reply message; the transmission mode of the heartbeat message may include: the BRAS equipment transmits the echo request message to the AAA server and the AAA server transmits the echo replay message to the BRAS equipment; the transmission mode of the heartbeat message may also include: the AAA server transmits the echo request message to the BRAS equipment and the BRAS equipment transmits the echo reply message to the AAA server.

Implementation of interaction of configuration information between the client and the server and of a load equalization function: in the embodiment, the second client is set as a BNG equipment (it can be predicted that the second client may also be one of gateway/server equipments such as a BRAS, an SR or an AC), the first server and the second server are both set as an AAA server, and it can be known from FIG. 10 that the RADIUS capability negotiation method in the embodiment includes:

S101, a BNG equipment transmits to the first server and the second server a first message carrying RADIUS parameters;

S102, a first server and a second server match respectively RADIUS parameters in the first message with RADIUS parameters supported by each of them to generate a matching result;

S103, the first server and the second server transmit respectively to the BNG equipment a second message carrying a matching result; in the embodiment, matching results of both the first server and the second server are set to successful matching;

S104, the first server and the BNG equipment perform authentication according to an authentication mode supported by them both, and the second server and the BNG equipment perform authentication according to an authentication mode supported by them both;

S105, the first server and the second server transmit respectively to the BNG equipment a first announcement message carrying configuration information and load information, and the BNG equipment transmits respectively to the first server and the second server a configuration response message and feeds back a response result;

specifically, the configuration information carried in the first announcement message includes an encryption/algorithm and a public key of an asymmetrical encryption algorithm calculated from certificates/configurations of both servers; the load information includes but is not limited to one or more of: the number of online users of the AAA serer, occupancy rate of CPU and a ratio between the number of online users and a maximum supportable number of users, and the load information is carried periodically or as required in a new first announcement message according to a local strategy by the first server and the second server for transmission to the BNG equipment;

S106, the client selects a server for a user terminal;

the user terminal performs dial-up and gets online, the BNG equipment selects, according to currently-recorded load conditions of the first server and the second server and a local load equalization strategy, one AAA server for performing authentication, authorization and accounting of user information. For example, when the load of the first server is relatively low, the BNG selects, according to the local strategy, the first sever for performing authentication, authorization and accounting of the user terminal, and various messages during the authentication, authorization and accounting of the user information are encrypted by the BNG equipment and the selected AAA server according to the encryption algorithm and secret key in step S95.

Implementation of version upgrading of an RADIUS protocol of a server and a compulsory switching function when the server has a failure: in the embodiment, the third client is set to an SR equipment (it can be predicted that the third client can also be one of gateway/server equipments such as a BRAS, a BNG or an AC), the first server and the second server are both set to an AAA server, and the following definitions are made: a user set A represents a set of online users that are authenticated, authorized and accounted by the SR equipment on the first server at a given time, a user set B represents a set of online users that are authenticated, authorized and accounted by the SR equipment on second server at the given time, and the first server is now required to perform version upgrading, the first server notifies the SR equipment to perform compulsory switching; it can be known from FIG. 11 that the RADIUS capability negotiation method in the embodiment includes:

S111, an SR equipment transmits to a first server and a second server a first message carrying RADIUS parameters;

S112, the first server and the second server match respectively the RADIUS parameters in the first message with RADIUS parameters supported by each of them to generate a matching result; in the embodiment, matching results of both the first server and the second server are set to successful matching;

S113, the first server and the second server transmit respectively to the SR equipment a second message carrying the matching result;

S114, the first server and the SR equipment perform authentication according to an authentication mode supported by them both, and the second server and the SR equipment perform authentication according to an authentication mode supported by them both;

S115, the first server transmits to the SR equipment a first announcement message carrying a compulsory switching identifier, and the SR equipment transmits to the first server a configuration response message and feeds back a response result;

S116, the SR equipment performs compulsory switching on a user set A;

the switching action includes: all users in the user set A are forced to get offline (then, users can perform manual or automatic dial-up on the client), accounting requests are transmitted to the second server for respective users in the user set A, local accounting is perform on the SR equipment for respective users in the user set A.

It can be known from above description that the embodiments of the disclosure at least have the following beneficial effects:

The client transmits a first message to perform RADIUS capability negotiation with the server, and then determines whether effective communication with the server can be established according to a matching result fed back from the server; the effective communication with the server is established only when the matching result indicates successful matching, it is ensured that the RADIUS capability of a client that can establish effective communication is consistent with or matches the RADIUS capability of both ends of the server, thus it is possible to extend the current RADIUS protocol and to solve the problem existing in the current RADIUS protocol, i.e., inconsistent RADIUS capability, between both ends of an RADIUS client and an RADIUS server, resulted from the fact that RADIUS communication cannot be performed between the RADIUS client and the RADIUS server where there is a connection established therebetween, and a resulted failure in authentication of a broadband user.

Preferably, when upgrading is performed on an individual RADIUS client or server, due to mismatching of versions or capability parameters, an upgraded side is forced to select other protocol that matching its capability so as to communicate with the other equipment, in this way, respective clients and servers in a network can be upgraded one by one without affecting implementation of existing AAA services;

preferably, by adding respectively an authentication mode and a suggested keep-alive cycle in the first message, it is possible to achieve the effect of negotiating, with the server, the authentication mode and the keep-alive mode and cycle;

preferably, the server transmits, to the client, the first announcement message carrying configuration information of the server, thus it is possible to achieve the effect of fast configuration of communication parameters and performing effective communication with the client;

preferably, by adding respectively load information of the server and a compulsory switching identifier in the first announcement message, it is possible to achieve the effect of selecting, by the client, a server according to operation conditions of respective servers; and preferably, the client transmits, to the server, the second announcement message carrying configuration information of the client, thus it is possible to achieve the effect of fast configuration of communication parameters and performing effective communication with the server.

It should be appreciated by those skilled in the art that various modules and steps of above embodiments of the disclosure can be implemented by a general-purposed computing device, and they may be integrated into an individual computing device or distributed on a network consisting of multiple computing devices; optionally, they can be implemented by program codes executable by a computing device so that they can be stored in a storage device so as to be implemented by a computing device, and in some cases, steps shown and described may be implemented in an order different from what described herein, or they can be implemented by being made as respective IC modules or by some modules or steps therein being made as individual IC modules; in this way, the embodiments of the disclosure are not limited to any combination of specific hardware and software.

The above are merely specific embodiments of the disclosure, and are not intended to limit the disclosure. Any simple changes, equivalent variations or modifications of the above embodiments based on the technical essence thereof all belong to the scope of protection of the technical solutions of the embodiments of the disclosure.

The invention claimed is:

1. A Remote Authentication Dial In User Service (RADIUS) capability negotiation method, comprising:
   transmitting, by a client, to servers a first message carrying RADIUS capability parameters of the client, wherein the RADIUS capability parameters of the client indicates RADIUS capability supported by the client;
   receiving, by the client, a first announcement message carrying at least one of load information or compulsory switching information of the server, after the client transmits the first message to servers;
   selecting, by the client, one server for user accessing from severs according to the load information or the compulsory switching information of one or more severs;
   receiving, by the client, a second message carrying a result of matching of the RADIUS capability parameters in the first message with RADIUS capability parameters of the server from the server, wherein the RADIUS capability parameters of the server indicates RADIUS capability supported by the server;
   determining, by the client, whether to establish effective communication with the selected server according to the matching result in the second message, and establishing by the client or the server, effective communication between the selected server and the client when the matching result indicates successful matching.

2. The RADIUS capability negotiation method according to claim 1, wherein the RADIUS capability parameters comprise Attribute Value Pair (AVP) set information.

3. The RADIUS capability negotiation method according to claim 1, wherein the first message further carries an authentication mode supported by the client and the second message further carries an authentication mode selected by the server; and
  after the client establishes effective communication with the server, the method further comprises: performing, by the client, authentication with the server according to the authentication mode selected by the server carried in the second message.

4. The RADIUS capability negotiation method according to claim 1, wherein the first message further carries a communication state detection mode supported by the client and the second message further carries a communication state detection mode selected from communication state detection modes supported by both the client and the server, wherein the communication state detection mode includes at least one of a hardware detection mode, slow hello mechanism mode, a detection mode with heartbeat messages or a detection mode with keep-alive messages; and
  after the client establishes effective communication with the server, the method further comprises: performing, by the client, communication state detection with the server according to the communication state detection mode selected by the server carried in the second message.

5. The RADIUS capability negotiation method according to claim 1,
  wherein the first announcement message further carries configuration information of the server; and, wherein the method further comprises:
  configuring, by the client, its communication parameters according to the configuration information in the first announcement message, and performing effective communication with the server; and/or
  configuring, by the client, assignment of a broadband user accessing the client to a server for authentication, authorization and accounting according to the load information in the first announcement message; and/or
  transferring compulsorily, by the client, a broadband user accessing a server to any other server according to the compulsory switching information in the first announcement message.

6. The RADIUS capability negotiation method according to claim 1, further comprising:
  after the client transmits the first message to the server, transmitting, by the client, to the server a second announcement message carrying configuration information of the client; and
  configuring, by the server, its parameters for communicating with the client according to the configuration information in the second announcement message, and performing effective communication with the client.

7. A client comprising a first transmission module, a first reception module and a first communication module, wherein
  the first transmission module is configured to transmit to servers a first message carrying Remote Authentication Dial In User Service (RADIUS) capability parameters of the client, wherein the capability parameters of the server indicates RADIUS capability supported by the server;
  the first reception module is configured to receive a first announcement message transmitted by the server and a second message fed back by the server, which carries a matching result obtained from matching, by the server, the RADIUS capability parameters in the first message with RADIUS capability parameters of the server, wherein the RADIUS capability parameters of the server indicates RADIUS capability supported by the server, wherein the a first announcement message carries at least one of load information or compulsory switching information of the server; and
  the first communication module is configured to select one server for user accessing from severs according to the load information or the compulsory switching information of one or more severs and determine whether to establish effective communication with the selected server according to the matching result in the second message, wherein the effective communication between the selected server and the client is established when the matching result indicates successful matching.

8. The client according to claim 7, wherein
  the first announcement further carries configuration information of the server; and
  the first communication module is further configured to configure its communication parameters according to the configuration information in the first announcement message, and to perform effective communication with the server; and/or
  the first communication module is further configured to configure assignment of a broadband user accessing the client to a server for authentication, authorization and accounting according to the load information in the first announcement message; and/or
  the first communication module is further configured to transfer compulsorily a broadband user accessing a server to any other server according to the compulsory switching information in the first announcement message.

9. The client according to claim 7, wherein the first transmission module is further configured to transmit to the server a second announcement message carrying the configuration information of the client.

10. A server comprising a second reception module, a matching module, a second transmission module and a second communication module, wherein
  the second reception module is configured to receive a first message transmitted from a client, which carries Remote Authentication Dial In User Service (RADIUS) capability parameters of the client, wherein the RADIUS capability parameters of the client indicates RADIUS capability supported by the client;
  the matching module is configured to capture the RADIUS capability parameters in the first message, match the RADIUS capability parameters in the first message with RADIUS capability parameters of the server to obtain a matching result, wherein the capability parameters of the server indicates RADIUS capability supported by the server; and
  the second transmission module is configured to transmit to the client a second message carrying the matching result, and wherein the effective communication between the server and the client is established when the matching result indicates successful matching, wherein the second transmission module is further configured to perform at least one of the following actions:

transmitting to the client a first announcement message carrying at least one of load information or compulsory switching information of the server; and wherein the load information of the server or the load information is used for the client selecting a user accessing server.

11. The server according to claim 10, wherein the first announcement message further carries configuration information of the server.

12. The server according to claim 10, further comprising a second communication module, wherein the second reception module is further configured to receive a second announcement message transmitted by the client, which carries configuration information of the client; and the second communication module is configured to configure its parameters for communicating with the client according to the configuration information in the second announcement message, and to perform effective communication with the client.

13. A Remote Authentication Dial In User Service (RADIUS) capability negotiation system comprising:

at least one client comprising: a first transmission module, a first reception module and a first communication module, wherein the first transmission module is configured to transmit to a server a first message carrying Remote Authentication Dial In User Service (RADIUS) capability parameters of the client, wherein the RADIUS capability parameters of the client indicates RADIUS capability supported by the client;

the first reception module is configured to receive a first announcement message transmitted from the server and a second message fed back by the server, which carries a matching result obtained from matching, by the server, the RADIUS capability parameters in the first message with RADIUS capability parameters of the server, wherein the RADIUS capability parameters of the server indicates RADIUS capability supported by the server, wherein the a first announcement message carries at least one of load information or compulsory switching information of one or more severs;

the first communication module is further configured to select one server for user accessing from severs according to the load information or the compulsory switching information of the server; and the first communication module is configured to determine whether to establish effective communication with the selected server when the matching result in the second message indicates RADIUS capability parameters of the client in the first message matches with RADIUS capability parameters of the server successfully;

at least one server comprising: a second reception module, a matching module and a second transmission module, wherein the second reception module is configured to receive a first message transmitted form a client, which carries Remote Authentication Dial In User Service (RADIUS) capability parameters of the client;

the matching module is configured to capture the RADIUS capability parameters in the first message, match the RADIUS capability parameters in the first message with RADIUS capability parameters of the server to obtain a matching result; and the second transmission module is configured to transmit to the client a second message carrying the matching result, wherein the second transmission module is further configured to transmit to the client a first announcement message carrying at least one of load information or compulsory switching information of one or more severs.

* * * * *